(12) United States Patent
Loiske et al.

(10) Patent No.: US 10,757,875 B2
(45) Date of Patent: Sep. 1, 2020

(54) DEVICE FOR HYDROPONIC CULTIVATION

(71) Applicant: PLANTUI OY, Turku (FI)

(72) Inventors: Janne Loiske, Kaarina (FI); Kari Vuorinen, Turku (FI); Matti Alen, Salo (FI)

(73) Assignee: PLANTUI OY, Salo (FI)

( * ) Notice: Subject to any disclaimer, the term of this patent is extended or adjusted under 35 U.S.C. 154(b) by 89 days.

(21) Appl. No.: 15/300,063

(22) PCT Filed: Mar. 26, 2015

(86) PCT No.: PCT/EP2015/056535
§ 371 (c)(1),
(2) Date: Sep. 28, 2016

(87) PCT Pub. No.: WO2015/144815
PCT Pub. Date: Oct. 1, 2015

(65) Prior Publication Data
US 2017/0150687 A1    Jun. 1, 2017

(30) Foreign Application Priority Data

Mar. 28, 2014  (DK) ...................... BA 2014 00055 U

(51) Int. Cl.
*A01G 31/02* (2006.01)
*A01G 7/04* (2006.01)

(52) U.S. Cl.
CPC ............. *A01G 31/02* (2013.01); *A01G 7/045* (2013.01); *Y02P 60/146* (2015.11); *Y02P 60/216* (2015.11)

(58) Field of Classification Search
CPC ........ A01G 31/02; A01G 7/045; A01G 27/00; A01G 2031/006

USPC .......... 47/61, 59, 60, 62, 63, 65, 66.5, 66.6, 47/66.7; 283/70, 72, 74, 80, 81, 98, 99, 283/117; 340/686.3, 686.4, 686.6
See application file for complete search history.

(56) References Cited

U.S. PATENT DOCUMENTS 4,216,618 A * 8/1980 Haub .................. A01G 31/045
                                                                 47/39
4,300,311 A    11/1981 Marchant
(Continued)

FOREIGN PATENT DOCUMENTS

CN          203181707 U      9/2013
JP          2005052105 A *   3/2005   ............. A01G 7/045
(Continued)

OTHER PUBLICATIONS

Jan. 15, 2019 Office Action issued in Japanese Application No. 2016-559905.
(Continued)

*Primary Examiner* — Tien Q Dinh
*Assistant Examiner* — Ebony E Evans
(74) *Attorney, Agent, or Firm* — Oliff PLC

(57) ABSTRACT

A device for hydroponic cultivation, the device including one or more room(s) for receiving one or more seed(s), one or more source(s) of artificial light, arranged to produce photosynthetically active radiation (PAR) to the one or more room(s). The device further includes a control unit for adjusting the photosynthetically active radiation (PAR) of the artificial light based on the growing phase of the plant(s) being grown in the device.

8 Claims, 3 Drawing Sheets

(56) References Cited

U.S. PATENT DOCUMENTS

| | | | | |
|---|---|---|---|---|
| 5,032,539 A | * | 7/1991 | Watanabe | H01L 33/0062 148/DIG. 66 |
| 5,067,275 A | | 11/1991 | Constance | |
| 5,323,567 A | * | 6/1994 | Nakayama | A01G 7/045 47/63 |
| 5,502,923 A | | 4/1996 | Bradshaw | |
| 5,771,634 A | * | 6/1998 | Fudger | A01G 31/02 47/59 R |
| 8,261,486 B2 | * | 9/2012 | Bissonnette | A01G 27/003 47/59 R |
| 8,823,495 B2 | * | 9/2014 | Wang | G06K 17/00 340/10.1 |
| 8,847,514 B1 | * | 9/2014 | Reynoso | A01G 7/045 315/307 |
| D729,115 S | * | 5/2015 | Prinster | D11/144 |
| 9,629,313 B1 | * | 4/2017 | Grossman | A01G 25/16 |
| 9,693,512 B2 | * | 7/2017 | Chen | H04W 4/80 |
| 2001/0047617 A1 | | 12/2001 | Blossom | |
| 2005/0102895 A1 | * | 5/2005 | Bissonnette | A01C 1/04 47/57.6 |
| 2005/0204620 A1 | | 9/2005 | Butterfield et al. | |
| 2005/0281027 A1 | * | 12/2005 | Capen | A01G 7/045 362/231 |
| 2007/0271841 A1 | * | 11/2007 | Bissonnette | A01C 1/02 47/61 |
| 2008/0282610 A1 | | 11/2008 | Bissonnette et al. | |
| 2009/0031622 A1 | | 2/2009 | Emoto | |
| 2009/0038221 A1 | * | 2/2009 | Poore, Jr. | A01G 27/003 47/62 R |
| 2009/0085750 A1 | * | 4/2009 | Waldner | H01Q 1/2208 340/572.7 |
| 2009/0151248 A1 | | 6/2009 | Bissonnette et al. | |
| 2010/0031566 A1 | * | 2/2010 | Azoulay | A01G 9/247 47/61 |
| 2011/0296757 A1 | | 12/2011 | McGrath | |
| 2012/0054061 A1 | | 3/2012 | Fok et al. | |
| 2012/0277117 A1 | | 11/2012 | Zayed et al. | |
| 2013/0074408 A1 | | 3/2013 | Singh | |
| 2013/0258684 A1 | * | 10/2013 | Yang | A01G 9/26 362/386 |
| 2014/0026474 A1 | | 1/2014 | Kulas | |
| 2014/0137468 A1 | * | 5/2014 | Ching | A01G 9/24 47/17 |
| 2014/0200690 A1 | * | 7/2014 | Kumar | A01G 22/00 700/90 |
| 2014/0259920 A1 | * | 9/2014 | Wilson | A01G 31/02 47/62 R |
| 2015/0305259 A1 | * | 10/2015 | Galassi | A01G 31/02 |
| 2015/0351325 A1 | * | 12/2015 | Shelor | H05B 45/22 47/58.1 LS |

FOREIGN PATENT DOCUMENTS

| | | | | |
|---|---|---|---|---|
| JP | 2008-079595 A | | 4/2008 | |
| JP | 2010088425 A | | 4/2010 | |
| JP | 2013-078336 A | | 5/2013 | |
| JP | 2013-202009 A | | 10/2013 | |
| KR | 20120025696 A | | 3/2012 | |
| WO | WO-2012075783 A1 | * | 6/2012 | A01G 7/045 |

OTHER PUBLICATIONS

May 14, 2019 Office Action issued in Japanese Patent Application No. 2016-559905.

* cited by examiner

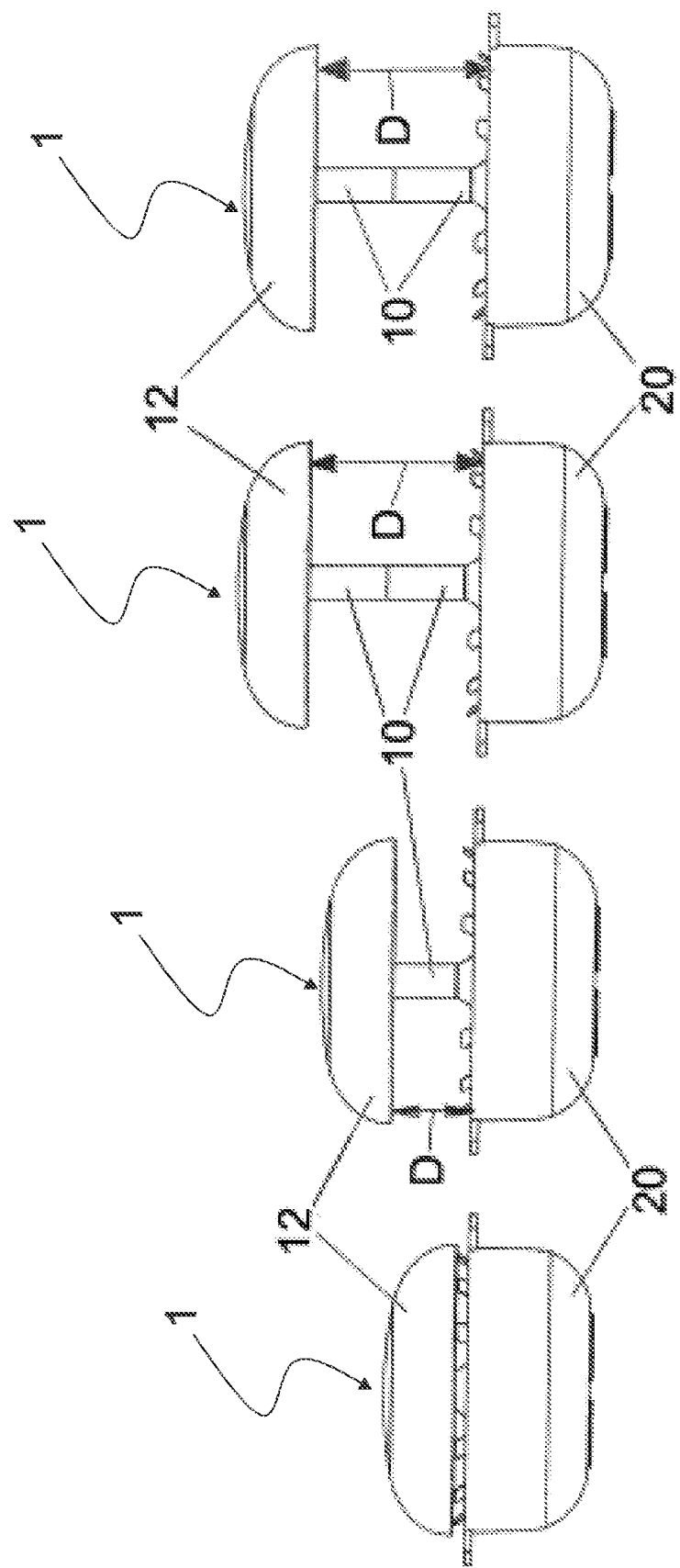

__DEVICE FOR HYDROPONIC CULTIVATION__

BACKGROUND

The invention relates to a device for hydroponic cultivation, the device comprising one or more room(s) for receiving one or more seed(s), one or more source(s) of artificial light, arranged to produce photosynthetically active radiation to said one or more room(s).

Hydroponics means the cultivation of plants without soil. Plants are cultivated using a liquid solution of water and nutrients.

Hydroponic indoor gardening devices have been created for cultivation of e.g. vegetables and herbs in end user environments, such as domestic environment, restaurants, and institutional kitchens etc.

Due to the demand for easy and convenient gardening, said hydroponic indoor gardening devices usually use removable baskets or cups or cartridges including growing medium therein. The plants are grown to maturity in said growing medium. These baskets or cups are easy to arrange into and remove from the cultivation devices. Still, there is a need in the art for even more convenient devices for indoor gardening.

BRIEF DESCRIPTION

Viewed from a first aspect, the device further comprises a control unit for adjusting the photosynthetically active radiation (PAR) of the artificial light based on the growing phase of the plant(s) being grown in the device.

Thereby a simple and convenient device for hydroponic cultivation may be achieved.

The device for hydroponic cultivation is characterised by what is stated in the characterising parts of the independent claim. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF FIGURES

Some embodiments illustrating the present disclosure are described in more detail in the attached drawings, in which FIGS. 3a-3d are schematic side views of an example device for indoor hydroponic cultivation.

In the figures, some embodiments are shown simplified for the sake of clarity. Similar parts are marked with the same reference numbers in the figures.

DETAILED DESCRIPTION

Figure 1:
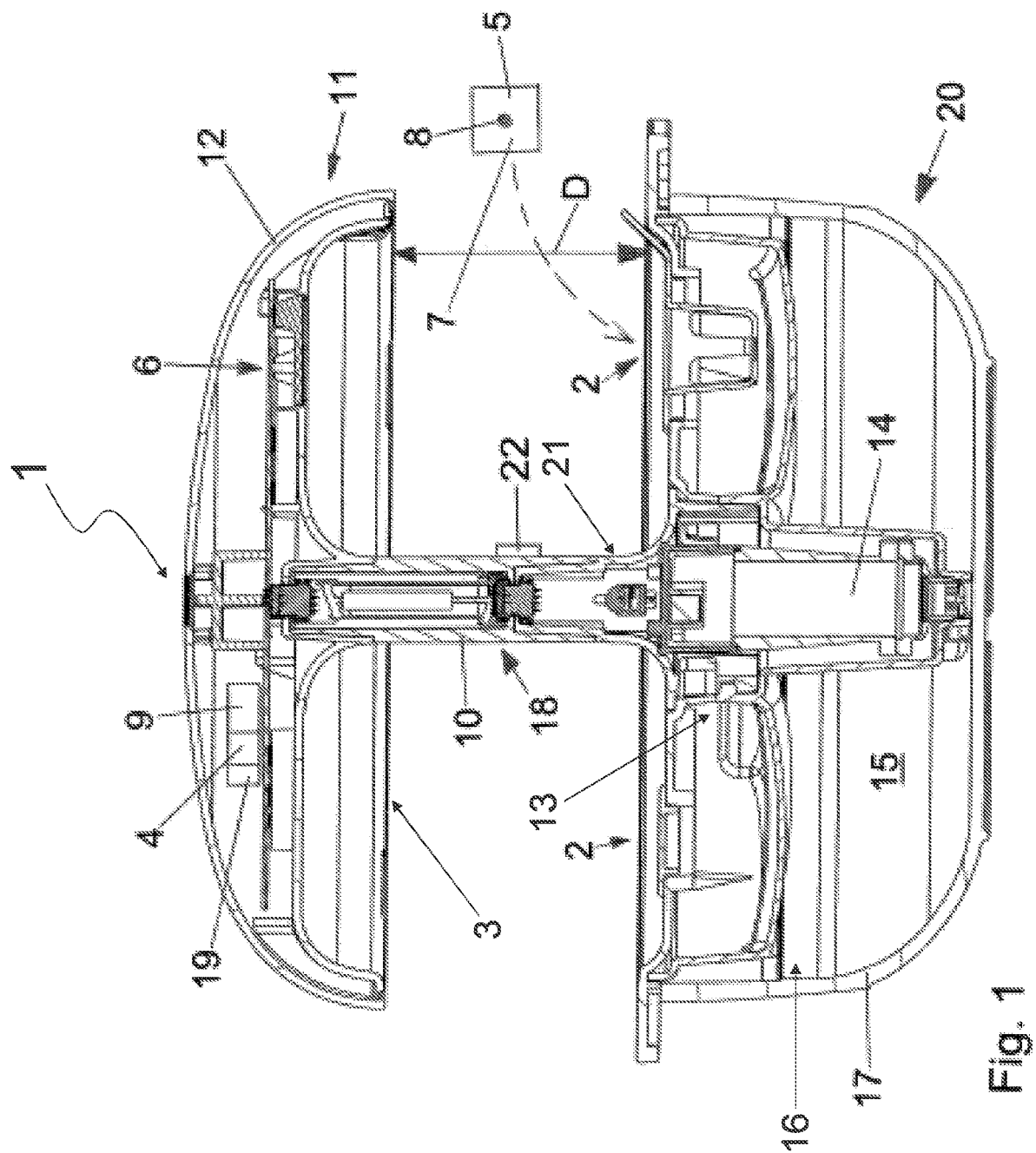
FIG. 1 is a schematic side view of an example device for indoor hydroponic cultivation in partial cross-section.
Figure 2B:
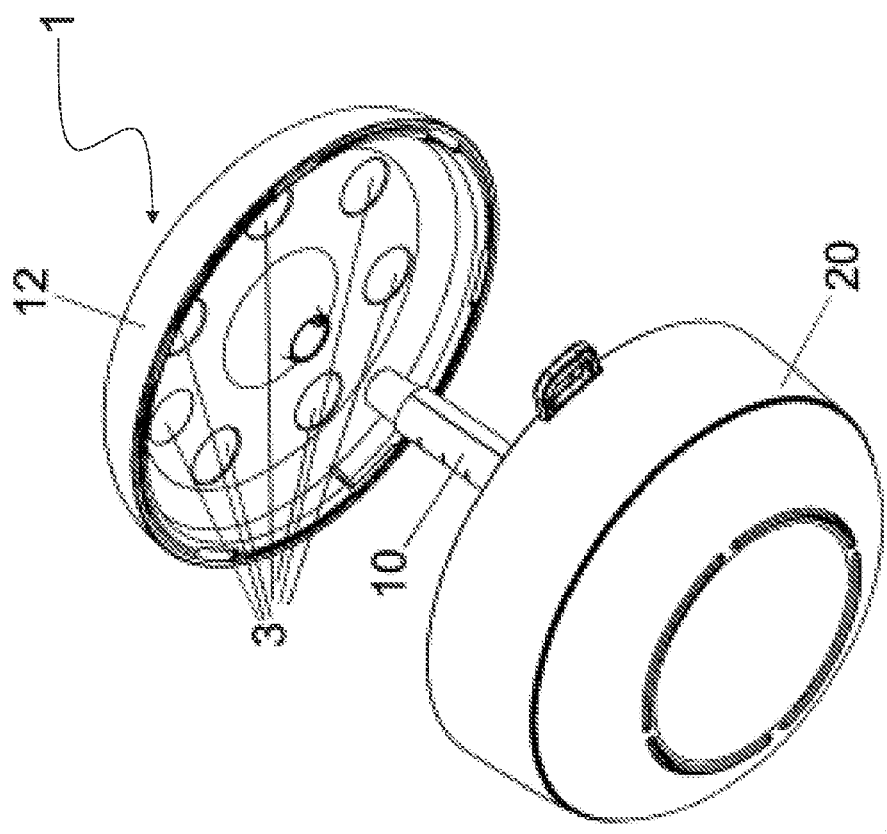
FIGS. 2a and 2b are schematic perspective views of the device shown in FIG. 1 for indoor hydroponic cultivation.
Figure 2A:
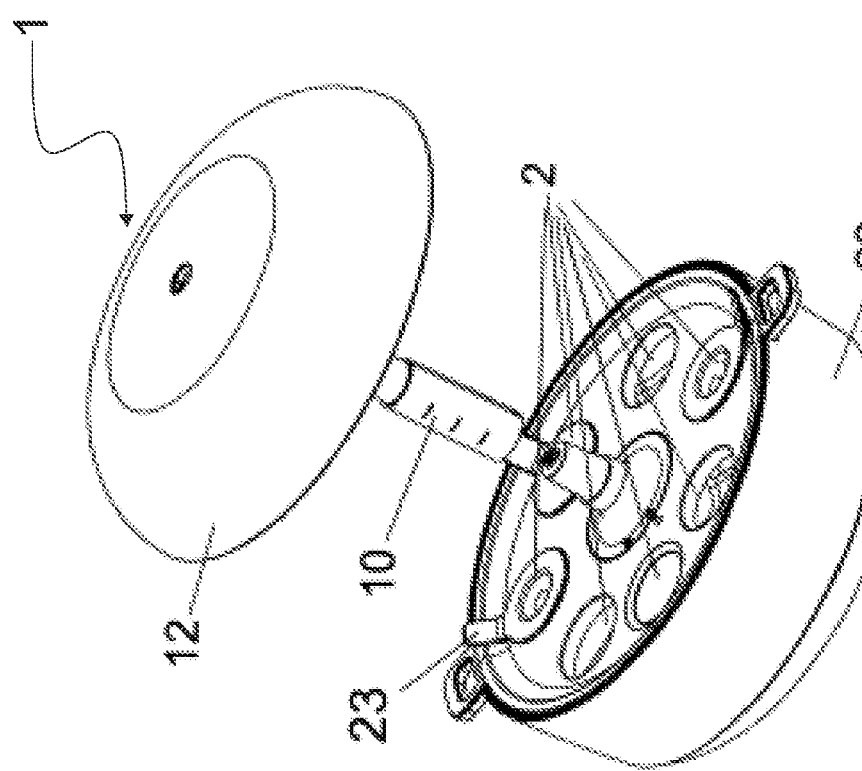

FIG. 1 is a schematic view of an example device for indoor hydroponic cultivation in partial cross-section, and FIGS. 2a, 2b are schematic perspective views of the same device.

In hydroponic growing of plants without soil in a liquid solution of water and nutrients, an artificial medium is used to provide mechanical support for the seed to be germinated and any seedling or mature plant developed therefrom. Thus, seed(s) to be germinated and grown may be provided embedded in a seed cartridge, which is generally composed of a material firm enough to hold the seed. In addition, the material should have porosity and water-retention characteristics which allow a liquid nutrient solution to flow to plant roots but which prevent the roots from being constantly immersed in the solution, such constant immersion predisposing the roots to rotting. Henceforth, said material is referred as "growing medium".

The plant may be selected from e.g. leafy greens, vegetable-like fruits or flowers.

As used herein, the term "leafy greens" refers to plants whose leaves and stems are used as food. This term includes vegetable greens or leafy vegetables such as lettuce, (e.g. cutting lettuce, batavia lettuce, stem lettuce, iceberg lettuce, and roman lettuce), spinach (e.g. baby spinach and New Zealdn spinach), bok Choy, tatsoi, mizuna, komatsuna, shiso, mangold, and herbs such as rucola (e.g. rocket rock), basil (e.g. vanilla basil, cinnamon basil, lemon basil, red basil, Thai basil, and bush basil), thyme, parsley, mint (e.g. green mint, peppermint, and apple mint), rosemary, coriander, marjoram, oregano, sage etc.

As used herein, the term "vegetable-like fruits" refers to plants that are used like vegetables but botanically are fruits. Non-limiting examples of such plants include tomato, cucumber, paprika and chili pepper.

Suitable flowers to be grown by the present method include but are not limited to annual flowers such as violet, (e.g. horned violet, sweet violet, and wild pansy), American saffron, cornflower, and marigold flower.

The device 1 comprises one or more room(s) 2 for receiving one or more seed(s) 8 and one or more source(s) 3 of artificial light arranged to produce photosynthetically active radiation (PAR) to said one or more room(s) 2.

In soil-less culture, artificial medium may be used to provide mechanical support for the seed 8 to be germinated and any seedling or mature plant developed therefrom.

Thus, any seed 8 to be germinated and grown by the present method may be provided embedded in a seed cartridge 5 as shown in FIG. 1. The seed cartridge 5 may be generally composed of a material firm enough to hold the seed 8. In addition, the material should have porosity and water-retention characteristics which allow a liquid nutrient solution to flow to plant roots but which prevent the roots from being constantly immersed in the solution, such constant immersion predisposing the roots to rotting.

The form and dimensions of the seed cartridge 5 may vary but it is typically a cylinder. The cartridge may be composed of a variety of different materials as readily understood by a skilled person. However, mineral wool or mineral fibres, such as rock wool or mineral wool, comprising e.g. basalt or perlite, is a preferred material. Another preferred material is sphagnum moss owing to its antiseptic and antibacterial properties. Also other organic materials, e.g. wood fibres, linen fibres, coir etc. may be used.

If desired, the top surface of the seed cartridge may comprise an opaque or non-transparent cover. One of the purposes of the cover is to prevent algae and mould from growing on top of the seed cartridge when exposed to light and humidity. Another purpose is to maintain appropriate moisture in the seed cartridge and, thus, prevent the seed from drying during germination. These aspects are particularly important when growing seeds with a long germination period. The cover may be made of a water-dispersible material, such as a tissue paper, which does not prevent the developing plant from growing through.

The shape of the seed cartridge 5 allows insertion in a hydroponic cultivation device 1, such as household hydroponic cultivation device. The device 1 comprises at least one opening 2 suitable for receiving the cartridge 5. The opening 2 may be just an opening or it may an opening of a cavity or well. The opening 2 supports the cartridge 5 during growing of plant(s).

According to an embodiment, the seed cartridge 5 may be inserted in a basket 23 that is detachable arrangeable in the opening 2. The basket 23 has an open structure in order to allow hydroponic solution get into the seed cartridge 5. The basket 23 may alleviate the handling of the seed cartridge 5, e.g. its insertion in and removal from the device 1.

The growing of plants from seeds 8 may be divided into distinct phases.

As used herein, the first phase is called "germination", a process by which the seed develops into a seedling. Generally, germination starts when a seed is provided with water. As a result, hydrolytic enzymes become active and they start breaking down food reserves, such as starch, proteins, or oils, stored in the seed into energy for the growth process and metabolically useful chemicals. In addition, the uptake of water leads to the swelling and the breaking of the seed coat. The first part of the seedling to emerge from the seed coat is the root followed by the shoot and, eventually, the seed leaves (i.e. cotyledons). By this time, the seed's food reserves are typically exhausted and future energy needed for continued growth is to be provided by photosynthesis. As used herein, the emergence of the seed leaves ends the germination phase. A typical, non-limiting example of the duration of the germination phase is from about seven to about ten days.

The second phase of plant growth is called "a seedling phase" and, as used herein, it spans from the emergence of the seed leaves to the seedling height of about a couple of centimeters, such as three centimeters. The exact measure may vary depending e.g. on the plant species, as readily understood by a skilled person. In any case, all seedlings are rich in nutrients and they are often regarded as a culinary delight.

The next growth phases in the life of a plant are called "a vegetative phase" and "a strong vegetative phase". Distinguishing these two growth phases is based on growth rates. During the early vegetative phase, i.e. the lag phase, the rate of plant growth is slow. However, during the strong vegetative phase, the growth rate increases rapidly at an exponential rate. During these two phases, plants are very active in photosynthesis in order to grow as much as possible before the onset of the next phase which, depending on the plant to be grown, is either a flowering phase, a generative phase, or a preservation phase. It is apparent to a person skilled in the art through which appropriate phases a plant is to be grown.

Sometimes it may be difficult to draw any exact lines between the strong vegetative phase, the flowering phase and the generative phase. For instance, different parts of a plant may be in a different growth phase and, depending on the species, the first weeks of the flowering phase may in fact be more a vegetative phase with rapid elongation and growth of stems and leaves.

As used herein, the term "generative phase" refers to a growth phase wherein the plant's energy is primarily directed toward creating fruit. Thus, including this phase in the present method applies in particular to vegetable-like fruits such as tomato, cucumber, paprika, and chili pepper.

As used herein, the term "preservation phase" refers to a stationary phase wherein the plant no longer elongates significantly. This phase may also be called as "uphold" or "harvesting" phase.

The present hydroponic cultivation device 1 may be used for all said phases or only some of them. In other words, the device 1 may be used in the germination phase only or it may comprise the phases from germination to seedling phase, early vegetative phase, strong vegetative phase, or flowering or preservation phase. Accordingly, the present device 1 may be used to obtain germinated seeds, sprouts, seedlings or mature plants. In any case, the starting material is a plant seed 8, preferably provided in a seed cartridge 5.

Plants need energy for their growth and development. The energy is obtained from sunlight through photosynthesis, which is a method where chlorophyll, i.e. green pigment found in plants, uses light energy to convert water and carbon dioxide into simple sugars and oxygen. These simple sugars are then used to make more complex sugars and starches to be utilized as energy reserves or structural components of the plant. For photosynthesis, plants are able to use sunlight in the 400 to 700 nanometer wavelength range, which corresponds more or less with the range of light visible to the human eye. This portion of the spectrum is known as photosynthetically active radiation (PAR) and it accounts for only 37% of solar energy, 62% of solar energy being within infrared wavelength (>700 nm) and the remaining 1% within ultraviolet wavelength (200 to 400 nm).

In plants, chlorophyll a is the major pigment involved in photosynthesis, while chlorophyll b acts as an accessory pigment and broadens the spectrum of light absorbed during photosynthesis. Chlorophyll a has an absorption peak at a wavelength of about 400 to 450 nm and at 650 to 700 nm; chlorophyll b at 450 to 500 nm and at 600 to 650 nm. The blue spectrum, i.e. about 400 to 500 nm, more specifically about 420 to about 480 nm, is primarily responsible for vegetative leaf growth. The red spectrum, i.e. about 600 to 700 nm, more specifically about 640 to about 690 nm, in turn, is particularly important for germination and root development. Furthermore, red light, when combined with blue light, encourages flowering.

On the other hand, plants do not absorb well in the green-yellow region but, instead, reflect it. This is the reason why plants appear green to the human eye.

In accordance with the above, in the present device 1 there is utilized one or more source of artificial light 3, such as light emitting diodes (LEDs) 6, designed to stimulate plant growth and development by emitting an electromagnetic spectrum appropriate for photosynthesis. Although plants do not absorb green light well, green spectrum, i.e. about 500 to 600 nm, more specifically about 510 to about 540 nm, may be used, particularly in the vegetative growth and maintenance phases of the present method, to intensify the green color reflected by the plants and, thus, to enhance esthetics.

Chlorophyl b absorbs yellow-orange light to some extent. Thus, if desired, the plant lights to be used in the present method may also comprise yellow spectrum, i.e. about 560 to about 620 nm. Sources of artificial light 3, or at least some of them, may be provided in a light unit 11 positioned above the plants to be grown at a first distance D. The light unit 11 is arranged in a support structure 12 that may be removable from lower part 20 of the device 1. The support structure 12 may create a shade for inhibiting light disturbing surroundings.

In a preferred embodiment, the source 3 of artificial light comprises plurality of LEDs 6. Separate LEDs 6 may be used for each of the spectral ranges of light to be utilized in any desired combination in the device 1. In a more preferred embodiment, each plant is grown under a red light emitting LED, a blue light emitting LED, and a green light emitting LED whose mutual proportional levels of photoradiation may be adjusted depending on the growth phase and/or the needs of the plant being cultivated. The spectral characteristics of the lights may be adjusted either linearly or stepwise.

The wavelength of the light emitted by LEDs, and thus the light's color, is adjustable by controlling the current through the LED. The LED's peak wavelength may be shifted within the limits of LED technology. Thus, LEDs having different dominant wavelengths may be adjusted to jointly cover a spectral range between the dominant wavelengths, and wider.

In addition to a proper spectral range, the source 3 of artificial light must also provide adequate light intensity in order to meet the plant's requirements. In LED technology, the intensity of the light emitted is adjustable by controlling the voltage through the LED.

Photosynthetically active radiation (PAR) is normally quantified as $\mu mol$ photons $m^{-2}s^{-1}$ (micromoles of photons per square meter per second), which is a measure of the photosynthetic photon flux density (PPFD). In southern hemisphere, full sunlight at noon during summer is about 2000 PPFD, and about 1000 PPFD during winter. Typically, plants require PPFD of about 200 to about 700 $\mu mol\ m^{-2}s^{-1}$ for their growth and development. To be more specific, many leafy greens such as lettuce, salads, and herbs require PPFD of about 200 to about 400 $\mu mol\ m^{-2}s^{-1}$, whereas many vegetable-like fruits such as tomato, chili, and paprika require PPFD of about 400 to about 700 $\mu mol\ m^{-2}s^{-1}$. Notably, typical lighting conditions indoors equal to about 15 $\mu mol\ m^{-2}s^{-1}$. Thus, sufficient light intensity provided by the artificial light source is important for growing healthy and sturdy mature plants with delicious taste or extensive blooming. However, many of the currently available indoor gardening devices do not fulfil the requirement of sufficient light intensity.

In the present device, PPFD of about 100 to about 400 $\mu mol\ m^{-2}s^{-1}$ is used for many leafy greens, depending on the growth stage and/or the requirements of the plant to be grown. In some preferred embodiments, PPFD of about 40 to about 140 $\mu mol\ m^{-2}s^{-1}$ is used in the germination phase, PPFD of about 190 to about 370 $\mu mol\ m^{-2}s^{-1}$ in the seedling phase, PPFD of about 210 to about 410 $\mu mol\ m^{-2}s^{-1}$ in the early vegetative phase, PPFD of about 230 to about 450 $\mu mol\ m^{-2}s^{-1}$ in the strong vegetative phase, PPFD of about 240 to about 460 $\mu mol\ m^{-2}s^{-1}$ in the possible flowering phase and/or PPFD of about 30 to about 140 $\mu mol\ m^{-2}s^{-1}$ in the preservation phase.

A further parameter affecting plants' growth and development is the "duration of light" which refers to the period of time in 24 hours that plants are exposed to light. Typically but not necessarily, the duration of light in the present growing method may vary from 12 to 24 hours depending on different variable such as the plant species and the growth phase in question. In some preferred embodiments the duration of light may vary independently from about 12 to about 16 hours in the germination phase, from about 16 to about 24 hours in the seedling phase, from about 16 to about 24 hours in the early vegetative phase, from about 16 to about 24 hours in the strong vegetative phase, from about 16 to about 24 hours in the flowering phase (if applicable) and/or from about 12 to about 16 hours in the preservation phase. Non-limiting examples of plants which require long exposure to light include tomato, chili pepper, paprika and medicinal *cannabis*.

In the present invention, transition from a growth phase to another requires adjustments in the lights, as set forth above. The adjustments may be carried out manually or automatically in different ways. For instance, automatic adjustment may be based on measuring the height of the seedling or growing plant by means of machine vision, 3D measurements, infrared measurements, chlorophyl measurements, ultrasound measurements, mass measurements etc. In some preferred embodiments, the adjustment in the lights is based on use of extension parts 10 which is discussed more detailed in later parts of this description.

The adjustment in the lights is controlled by a control unit 4. The control unit 4 comprised a processor known as such. A computer program code is executed in the processor, the source 3 of artificial lights being controlled by means of the computer program code.

The computer program code may be loaded from an internal memory of the control unit 4. The computer program code may be transferred to the control unit 4 from a separate external memory means, such as a memory stick. It may also be transferred via a telecommunication network, for example by connecting the control unit 4 via a wireless access network to the Internet. The control unit 4 may also be remote controlled via a telecommunication network. Thus a user may control the device 1 by means of e.g. cellular phone or personal computer, and on the other hand, the user may receive information about selected variables of the growing process and/or the device 1. Therefore, the control unit 4 may comprise a receiver-transmitter unit 9.

The control unit 4 may also comprise a user interface 21 via which the user using the device 1 can control the functions of the device manually. Manual adjustment may be particularly desirable for education purposes. Thus, the effect of different light conditions on plant growth may be studied. The user interface 21 may comprise a user panel in the device, e.g. in the support structure 12 or the lower part 20, and/or a remote controller through which the user is able to control the device 1 at a distance from the device 1.

As the plants grow, they need more space between the support structure 12 and the lower part 20. According to an embodiment, the device 1 comprises one or more intelligent extension part(s) 10 that can be attached between the support structure 12 and the lower part 20 for changing the first distance D. This way the user of the device 1 can easily create said space for the plants.

The intelligent extension parts 10 can be manufactured in different lengths, and two or more intelligent extension parts 10 can also be attached successively to each other. Thus the first distance D may be adjusted according to plants need. This effect has been shown in FIGS. 3*a*-3*d*.

The intelligent extension part 10 may comprise an identifier means 18 and the control unit 4 may comprise an identification means 19 that are able to identify said identifier means 18. Thus, the control unit 4 is able to identify the intelligent extension part 10 that is attached to the device 1. Due to this identification, the control unit 4 may adjust the photosynthetically active radiation (PAR) in optimal spectral range and light intensity. The function of the identifier means 18 may be based on wired or wireless solutions. The identifier means 18 may e.g. comprise just a component that changes current or voltage in a wire connected to the identification means 19, RFID tag etc.

According to a preferred embodiment, the intelligent extension part 10 comprises fastening elements which can be quickly and without any tools attached to their counterparts in the support structure 12 and the lower part 20.

According to an embodiment, the intelligent extension part 10 comprises at least one extension part light unit 22 for emitting an electromagnetic spectrum appropriate for the plants. The extension part light unit 22 is especially useful when the plants are high and has dense foliage. In this kind of cases, leaves, fruits etc. situated in the inner parts of the growth could miss out on appropriate lighting without the extension part light unit 22. The spectral range and light intensity of the extension part light unit 22 may be adjusted by the control unit 4.

The plants need not only light but also water and nutrients for growing. Therefore, the device 1 comprises an irrigation system 13 arranged to deliver water and nutrients, i.e. hydroponic solution, to the seed 8 or plant to be grown. It is also possible to deliver water without nutrients.

According to an embodiment, a pump 14 is arranged to pump hydroponic solution periodically from a hydroponic solution reservoir 15 to the seed cartridges 5 or plants to be grown. The hydroponic solution is then allowed to drain back to said reservoir 15. This so called ebb and flow cycle is repeated a couple of times, e.g. two to four times, a day depending on variables such as temperature, growth phase, and specific requirements of the plant to be grown. In some preferred embodiments, irrigation is carried out from one time in two days to one time a day during the germination phase, form one to two times a day during the seedling phase, from two to six times a day during the early vegetative phase, from six to ten times a day during the strong vegetative phase, from six to ten times a day during the flowering phase (if applicable) and/or from three to six days during the preservation phase. However, the use of the present device is not limited to any particular irrigation schedule.

The ebb and flow arrangement provides several advantages. For instance, the roots of the plants are not immersed in water constantly and, thus, the risk of rotting is minimized. Furthermore, as the pump 14 is active only few times a day, the device 1 is a silent one in contrast to many currently available home garden devices. Operation of the pump 15 may be adjusted linearly or stepwise by e.g. the control unit 4 and/or the user interface 21.

The irrigation system 13 may involve an alerting means which alerts e.g. by a sound or light indicator, when it is time to add water and/or nutrients to the reservoir 15.

According to an embodiment, the hydroponic solution draining back to the reservoir 15 flows through the pump 14. In other words, the pump 14 is arranged to allow a reverse flow of the hydroponic solution. This way the pump 14 can be cleaned from small particles of nutrients and growing medium which otherwise could block the pump 14.

Formation of algae and mould is a particular problem in indoor gardens. In the present device 1 this problem may be avoided by different ways.

According to an embodiment, the device 1 comprises an UV light source 16 arranged to radiate to irrigation system 13. UV light kills any algae or mould formed in the reservoir 15.

According to another embodiment, the material of the outer walls 17 of the lower part or at least the walls of the irrigation system 13 are manufactured from a material being opaque to light essential for growth of algae or mould. Thus possible problems caused by algae or mould can be avoided. According to an idea, the cover is opaque to at least wave lengths range of blue spectrum, i.e. about 400 to 500 nm, and red spectrum, i.e. about 600 to 700 nm.

Thus said walls constitute structures preventing light essential for propagation of algae and mould to pass in the irrigation system 13.

FIGS. 3*a*-3*d* are schematic side views of an example device for indoor hydroponic cultivation. In the device 1 the first distance D is adjusted there by intelligent extension parts 10.

The device 1 is shown in FIG. 3*a* in the germination phase of plant growth during which the seed develops into a seedling. In the embodiment shown in FIGS. 3*a*-3*d*, there are no intelligent extension parts 10 arranged in the device 1 during the germination phase. Instead, the support structure 12 with the source of artificial light 3 is attached directly to the lower part 20 of the device. Thus the first distance D is at its minimum.

According to an idea, the source of artificial light provides light intensity during the germination phase as follows:
red light 30 $\mu mol\ m^{-2}s^{-1}$,
blue light 60 $\mu mol\ m^{-2}s^{-1}$, and
green light 0 $\mu mol\ m^{-2}s^{-1}$.

Further, according to an idea, plants are watered one time per two days during the germination phase.

The device 1 is shown in FIG. 3*b* in the seedling phase of plant growth during which the seed develops into sprout. There is one intelligent extension part 10 arranged between the support structure 12 and the lower part 20 in the device 1 during the seedling phase. Thus the first distance D is greater as in the germination phase.

According to an idea, the source of artificial light provides light intensity during the seedling phase as follows:
red light 120 $\mu mol\ m^{-2}s^{-1}$,
blue light 170 $\mu mol\ m^{-2}s^{-1}$, and
green light 40 $\mu mol\ m^{-2}s^{-1}$.

Further, according to an idea, plants are watered two times per day during the seedling phase.

The device 1 is shown in FIG. 3*c* in the vegetative phase of plant growth during which the size and length of the plant(s) are estimated visually by the user of the device 1. According to the estimation, the extension parts 10 are added when necessary to the device 1. There is two intelligent extension parts 10 arranged between the support structure 12 and the lower part 20 in the device 1 during the vegetative phase. Thus the first distance D is greater as in the seedling phase.

According to an idea, the source of artificial light provides light intensity during the vegetative phase as follows:
red light 120 $\mu mol\ m^{-2}s^{-1}$,
blue light 170 $\mu mol\ m^{-2}s^{-1}$, and
green light 40 $\mu mol\ m^{-2}s^{-1}$.

Further, according to an idea, plants are watered about eight times per day.

The device 1 is shown in FIG. 3*d* in the preservation phase of plant growth during which the plant is kept alive, but its growth is kept as slow as possible. This way the plant can be preserved in good condition for long time.

There is two intelligent extension parts 10 arranged between the support structure 12 and the lower part 20 in the device 1 during the preservation phase. Thus the first distance D is same as in the vegetative phase. The user may change from the vegetative phase to the preservation phase by using the user interface 21.

According to an idea, the source of artificial light provides light intensity during the preservation phase as follows:
red light 20 µmol m$^{-2}$s$^{-1}$,
blue light 20 µmol m$^{-2}$s$^{-1}$, and
green light 20 µmol m$^{-2}$s$^{-1}$.

Further, according to an idea, plants are watered about eight times per day.

The light intensity and spectrum as well as the irrigation in the above mentioned phases are controlled by the control unit 4 as discussed earlier in this description.

Additionally, both the light and irrigation may be set on a so-called holiday mode which provides sufficient light and water to the plant to be grown so that it stays alive but does not grow significantly.

One of the advantages of the present device is that high yields may be obtained with low carbon footprints. Thus, the present device is environmentally healthy. This is, at least partly, because the present device does not require heating, cooling, or addition of $CO_2$. The most efficient greenhouses in the world are able to produce lettuce in a yield of approximately 80 to 100 kg m$^{-2}$. The present device, in turn, may produce approximately 60 kg m$^{-2}$ of lettuce with an energy consumption of only one tenth of that of the above-mentioned world's most efficient greenhouses. Thus, the present device may be used for decentralized food production in urban settings.

In general, the form and size of the device may vary. In an embodiment, the device 1 is a countertop garden, which is particularly suitable for domestic use. In some other embodiments, the device 1 is a multistorey, stacked system particularly suitable for use in environments where greater yield is desired. Non-limiting examples of such environments include restaurants and institutional kitchens.

In some other embodiments, the function of the present device relies on aeroponics. As used herein, the term "aeroponics" refers to a sophisticated form of hydroponics wherein a nutrient dense mist, i.e. a cloud of moisture containing nutrients with air, is sprayed on to the roots at certain intervals. In these embodiments, aeroponic solution, i.e. water, nutrients, and air, is sprayed periodically by a spraying device to the seeds or the roots of the plants to be grown. The spraying interval may be adjusted freely depending on different variables, such as temperature, growth phase, and specific requirements of the plant to be grown.

As in the ebb and flow arrangement, the aeroponic arrangement may provide several advantages. For instance, the roots are not immersed in water constantly and, thus, the risk of rotting is minimized. Furthermore, as the pump is active only few times a day, the use of the device is silent in contrast to many currently available home garden devices. Operation of the pump may be adjusted linearly or stepwise.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 device
2 room
3 source of artificial light
4 control unit
5 seed cartridge
6 LED
7 growing medium
8 seed
9 receiver-transmitter unit
10 intelligent extension part
11 light unit
12 support structure
13 irrigation system
14 pump
15 hydroponic solution reservoir
16 UV light source
17 outer wall
18 identifier means
19 identification means
20 lower part
21 user interface
22 extension part light unit
23 basket
D first distance

The invention claimed is:

1. A device for hydroponic cultivation, the device comprising:
a support structure comprising a light unit, and a lower part, the support structure and the lower part having an adjustable vertical distance between them,
one or more room(s) for receiving one or more seed(s) in the lower part,
one or more source(s) of artificial light in the light unit, arranged to produce photosynthetically active radiation to said one or more room(s),
a control unit configured to adjust the photosynthetically active radiation of the artificial light based on the growing phase of the plant(s) being grown in the device in such a manner that when the distance between the support structure and the lower part changes, the control unit is configured to adjust the photosynthetically active radiation in optimal spectral range and light intensity with respect to the growing phase,
an irrigation system arranged to deliver hydroponic solution to the seed or plant to be grown by ebb and flow cycles,
an intelligent extension part or multiple intelligent extension parts of the same or different lengths, each of which is arrangeable in said support structure configured to adjust said vertical distance, either by replacing one part with another part of longer length, or attaching parts successively to each other, as the plant grows, each of the intelligent extension parts comprising an identifier means configured to identify the length of the part,
the totality of the identifier means configured to identify the distance between the support structure and the lower part, and wherein
the control unit comprises:
an identification means configured to identify said identifier means,
the control unit being arranged to adjust the photosynthetically active radiation based on said identification.

2. The device as claimed in claim 1, wherein each of the one or more rooms is arranged to receive a seed cartridge, the seed cartridge comprising a growing medium and at least one seed arranged in said growing medium.

3. The device as claimed in claim 1, wherein the source of artificial light comprises plurality of LEDs.

4. The device as claimed in claim 3, wherein the plurality of LEDs include a red light emitting LED, a blue light emitting LED, and a green light emitting LEDs.

5. The device as claimed in claim 1, wherein the control unit is a remote controlled control unit.

6. The device as claimed in claim 1, comprising a pump arranged to work in two phases: in a flow phase the pump is arranged to create a flow of hydroponic solution from a hydroponic solution reservoir to the one or more room(s), and in an ebb phase the pump is arranged to allow a reverse flow of hydroponic solution from the rooms(s) through the pump back in the hydroponic solution reservoir.

7. The device as claimed in claim 1, wherein the irrigation system is arranged to be controlled based on said identification.

8. The device as claimed in claim 1, comprising an UV light source arranged to radiate to irrigation system.

* * * * *